United States Patent
Watanabe et al.

(10) Patent No.: US 8,268,046 B2
(45) Date of Patent: Sep. 18, 2012

(54) REMOVAL OF IMPURITIES FROM HYDROGEN-CONTAINING MATERIALS

(75) Inventors: Tadaharu Watanabe, Longmont, CO (US); Mark Raynor, Longmont, CO (US); Ade Lau, Longmont, CO (US); Hirotaka Mangyo, Longmont, CO (US)

(73) Assignee: Matheson Tri-Gas, Basking Ridge, NJ (US)

( * ) Notice: Subject to any disclaimer, the term of this patent is extended or adjusted under 35 U.S.C. 154(b) by 537 days.

(21) Appl. No.: 12/466,272

(22) Filed: May 14, 2009

(65) Prior Publication Data

US 2009/0282975 A1 Nov. 19, 2009

Related U.S. Application Data

(60) Provisional application No. 61/053,990, filed on May 16, 2008.

(51) Int. Cl.
*B01D 53/02* (2006.01)

(52) U.S. Cl. .............. 95/116; 95/117; 95/128; 95/133; 95/143

(58) Field of Classification Search ...... 95/90, 115–117, 95/130, 133, 143; 96/153
See application file for complete search history.

(56) References Cited

U.S. PATENT DOCUMENTS

| | | | |
|---|---|---|---|
| 2,736,669 A | 2/1956 | Goebel | |
| 2,971,607 A | 2/1961 | Caswell | |
| 3,494,938 A * | 2/1970 | Hoch et al. | 549/457 |
| 3,851,003 A | 11/1974 | Wilhelm | |
| 4,156,689 A | 5/1979 | Ashby et al. | |
| 4,552,974 A * | 11/1985 | Fukuoka et al. | 560/25 |
| 4,698,218 A | 10/1987 | Belot et al. | |
| 4,976,942 A | 12/1990 | Kitahara et al. | |
| 5,089,244 A | 2/1992 | Parent et al. | |
| 5,154,822 A * | 10/1992 | Simpson et al. | 210/198.2 |
| 5,569,775 A | 10/1996 | Diaz et al. | |
| 6,048,509 A | 4/2000 | Kawai et al. | |
| 6,110,258 A | 8/2000 | Fraenkel et al. | |
| 6,241,955 B1 | 6/2001 | Alvarez, Jr. | |
| 6,576,138 B2 | 6/2003 | Sateria et al. | |
| 6,733,734 B2 | 5/2004 | Watanabe et al. | |
| 7,033,418 B2 | 4/2006 | Watanabe et al. | |
| 2003/0097929 A1 | 5/2003 | Watanabe et al. | |
| 2003/0116421 A1 | 6/2003 | Xu et al. | |
| 2005/0054211 A1 | 3/2005 | Xu et al. | |
| 2005/0120877 A1 | 6/2005 | Wu et al. | |
| 2006/0222583 A1 | 10/2006 | Hazeltine | |
| 2007/0151452 A1 * | 7/2007 | Giacobbe | 95/143 |

OTHER PUBLICATIONS

PCT International Search Report and Written Opinion mailed Jul. 2, 2009; International Application No. PCT/US09/44223, 11 pages.

* cited by examiner

*Primary Examiner* — Duane Smith
*Assistant Examiner* — Christopher P Jones
(74) *Attorney, Agent, or Firm* — Kilpatrick Townsend & Stockton LLP (57) ABSTRACT

Methods of purifying hydrogen-containing materials are described. The methods may include the steps of providing a purifier material comprising silica. The silica may be heated at temperature of about 100° C. or more in a dry atmosphere to form activated silica. The activated silica may be contacted with a starting hydrogen-containing material, where the activated silica reduces a concentration of one or more impurity from the starting hydrogen-containing material to form the purified hydrogen-containing material, and where the activated silica does not decompose the purified hydrogen-containing material.

52 Claims, 8 Drawing Sheets

REMOVAL OF IMPURITIES FROM HYDROGEN-CONTAINING MATERIALS

CROSS-REFERENCES TO RELATED APPLICATIONS

This application claims priority to U.S. Provisional App. No. 61/053,990, filed May 16, 2008, and titled "REMOVAL OF IMPURITIES FROM METAL HYDRIDES", the entire contents of which are herein incorporated by reference for all purposes.

BACKGROUND OF THE INVENTION

A wide range of hydride gases are used to make materials for semiconductor devices. As these devices continue to increase in complexity and precision, the purity requirements for the starting materials that are used to make them has also increased.

Metal hydrides such as silanes (i.e., hydride gases of silicon) are used in a variety of semiconductor fabrication processes, including epitaxial growth of silicon metal films to make silicon wafer substrates. In vapor-phase epitaxy (VPE) gases of silicon halides and/or silicon hydrides (silanes) are chemically decomposed on a substrate surface to deposit silicon metal and vapor-phased exhaust products such as hydrogen gas ($H_2$) and hydrogen halides (e.g., HCl(g) when the silicon precursor is a silicon chloride).

During the growth of the silicon layer by VPE, moisture levels are carefully monitored and controlled. Unlike chemical vapor depositions of silicon dielectric films like silicon oxide, even relatively low levels of moisture contamination is problematic for silicon VPE because the oxidation of a silicon metal film has a much larger adverse impact on the film's electrical characteristics. Water vapor is one of the most common, and yet most difficult impurities to remove from process gases like silanes. Most drying processes try to reduce the moisture levels in the silane to a parts-per-million (ppm) range. However, silicon VPE processes for making silicon films for modern semiconductor and electronic components more often require reduced moisture levels in the tens to hundreds parts-per-billion (ppb) range.

Unfortunately, the delivery of ultra-high purity silane gases with low levels of moisture contaminants faces a number of challenges. Moisture and other contaminants in silanes can come from the fabrication of the source gas itself, as well as during the subsequent packaging, shipment, storage, and handling of the gas. While the silane gas manufacturer typically provides a contaminant analysis when the gas leaves the production facility, these purity levels often change as additional contaminants are introduced from outgassing by the containers (e.g., gas cylinders), as well as leaks and residual contaminants present in downstream delivery equipment.

The presence of moisture in the ambient atmosphere provides many opportunities for moisture to contaminate highly pure silanes and other metal hydrides before reaching their point of end use. Thus, there remains a need for methods and materials to purify metal hydrides such as silanes to a point where they are acceptable for use in modern electronic and semiconductor manufacturing processes. This and other problems are addressed by embodiments of the present invention.

BRIEF SUMMARY OF THE INVENTION

Purifying methods, materials, and systems are described for removing moisture and other impurities from hydrogen-containing gases such as, for example, silane gases. One example of a silane gas used in embodiments of the invention is trisilane ($Si_3H_8$). Trisilane can be used to grow thin films of pure silicon (Si) and silicon-germanium (Si—Ge) alloys at lower temperature than silane ($SiH_4$), which is sometimes referred to here as "monosilane" to avoid confusion with the term "silanes" that refers to the class of silicon hydride compounds $Si_xH_y$ (where x=1 or more, and y=2x+2).

While trisilane may offer some advantages over monosilane, especially for meeting low thermal budget requirements, it can be more challenging to purify. Many conventional monosilane purification materials used primarily for moisture removal can also significantly decompose trisilane into smaller silanes like monosilane and disilane. Thus, the purifier materials and activation methods have to be carefully selected to accomplish the moisture removal goals without substantially decomposing poly-metal hydrides (e.g., $M_xH_y$, were x=2 or more) into smaller hydrides and/or other decomposition products.

Furthermore, poly-metal hydride production methods also typically produce some fraction of higher metal hydrides. For example, the production of trisilane typically produces tetrasilane (e.g., n-tetrasilane and iso-tetrasilane) impurities. Embodiments include methods and materials that can remove (e.g., decompose) these higher metal hydrides at a faster rate than the poly-metal hydride, increasing the relative concentration of the poly-metal hydride in the purified product.

Embodiments of the invention include methods of purifying a hydrogen-containing material. The methods may include the steps of providing a purifier material comprising silica. The silica may be heated at temperature of about 100° C. or more in a dry atmosphere to form activated silica. The activated silica may be contacted with the starting hydrogen-containing material, where the activated silica reduces a concentration of one or more impurity from the starting hydrogen-containing material to form the purified hydrogen-containing material, and where the activated silica does not decompose the purified hydrogen-containing material.

Embodiments of the invention also include methods of reducing impurities in a poly-metal hydride. The methods may include the steps of providing a purifier material comprising silica and having a $SiO_2$:$Al_2O_3$ mole ratio greater than 1000. The purifier material may be contacted with the poly-metal hydride, where the purifier material reduces a concentration of higher metal hydrides that have a greater number of metal atoms than the poly-metal hydride. Embodiments may also include having the purifier material reduce the concentration of lower metal hydrides in the poly-metal hydride, wherein the lower metal hydrides have a smaller number of metal atoms than the poly-metal hydride that is being purified.

Embodiments of the invention further include systems to generate purified hydrogen-containing material. The systems may include a source of starting hydrogen-containing material comprising one or more impurities. The systems may also include a purifier unit comprising activated silica. The activated silica may be formed by heating the silica to a temperature of about 100° C. or more in a dry atmosphere. The systems may still further include an outlet downstream from the purifier unit to release the purified hydrogen-containing material from the purifier unit, where the purified hydrogen-containing material has a reduced concentration of the one or more impurity.

Additional embodiments and features are set forth in part in the description that follows, and in part will become apparent to those skilled in the art upon examination of the specification or may be learned by the practice of the invention.

The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Methods and systems are described for removing impurities (such as moisture) from hydrogen-containing materials (such as metal hydrides). The purifier materials are selected and treated so that they remove a majority of the impurities without decomposing large amounts of the hydrogen-containing materials into smaller species. For example, when the hydrogen-containing material is a poly-metal hydride, purifier materials are selected and treated to reduce the decomposition of the poly-metal hydride into lower hydrides that contain fewer numbers of metal atoms (e.g., the decomposition of trisilane into mono- and disilanes).

The moisture levels in the purified hydrogen-containing materials have a substantially reduced amount of moisture, with reductions in moisture concentration of 90% or more being achievable. Recontamination of the purified hydrogen-containing materials may also be reduced by purifying them in situ at a point of use. The reduced transport, storage time, and exposure to gas delivery equipment can keep the impurity concentrations low as the purified hydrogen-containing materials are immediately consumed in, for example, semiconductor manufacturing equipment.

The hydrogen-containing materials that can be purified may include mono-hydrides (e.g., hydrides with a single metal atom) and poly-hydrides that have two or more non-hydrogen elements that are bonded together. For example, poly-hydrides may include poly-metal hydrides that have two or more metal atoms that are bonded together. Poly-metal hydrides may also include isomeric configurations of the hydrides (e.g., n-tetrasilane versus iso-tetrasilane).

The hydrogen-containing materials may include a variety of materials, including Group III (e.g., B, Al, Ga, In, Tl), Group IV (e.g., C, Si, Ge, Sn, Pb), and Group V (e.g., N, P, As, Sb, Bi) elements that are bonded to one or more hydrogen atoms. The materials may also include combinations of two or more of these elements. When the hydrogen-containing material is a metal hydrides, the hydride may include any metal element capable of forming at least a partially stable hydride. These may include metals from the periodic table's Group III (e.g., B, Al, Ga, In, Tl), Group IV (e.g., Si, Ge, Sn, Pb), and/or Group V (e.g., P, As, Sb, Bi), among other metals. The metal hydrides may also include combination of two or more different metal elements (e.g., a hydride comprising Si and Ge, Si and P, Si+P+Ge, etc.). The metal hydride sample may also include combinations of two or more metal hydride compounds, (e.g., trisilane and poly-germanium hydride).

Exemplary Methods

Figure 1:
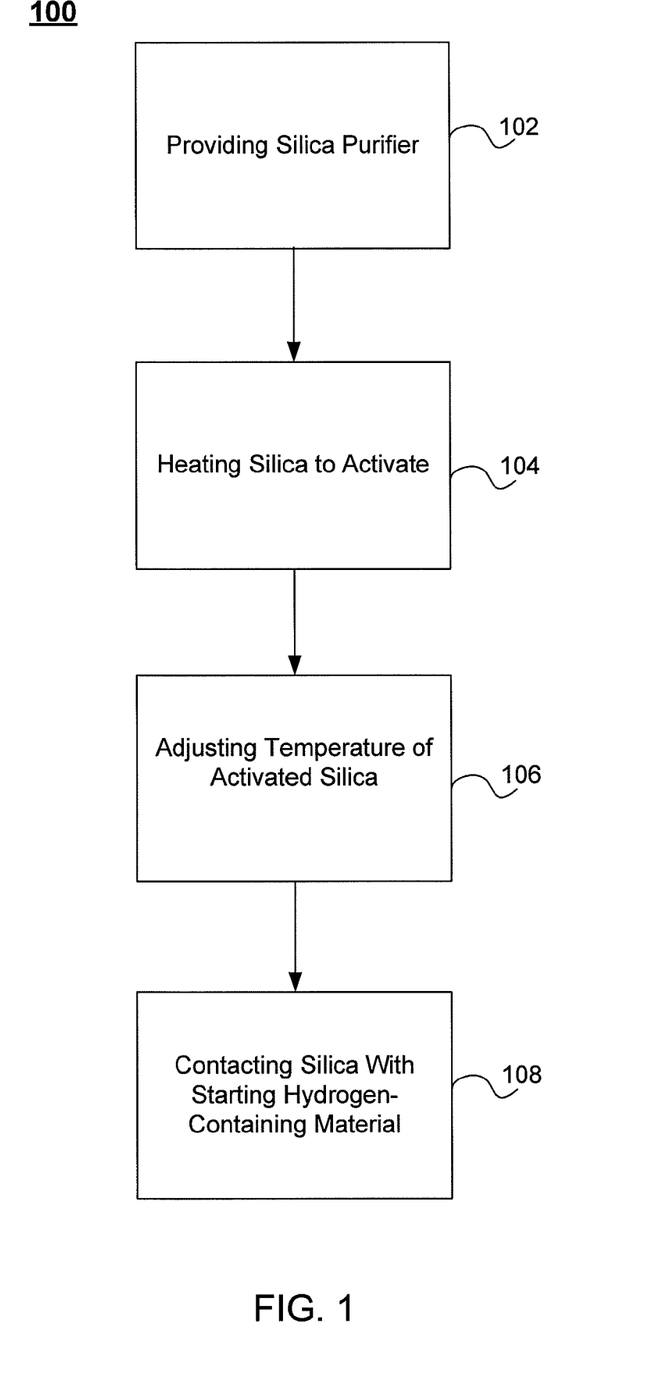
FIG. 1 is a flowchart showing selected steps in methods of purifying hydrogen-containing compositions according to embodiments of the invention.

FIG. 1 shows selected steps in a method 100 of purifying a hydrogen-containing material according to embodiments of the invention. The method 100 may include providing a purifier material 102 which may be a silica (e.g., a silica gel and/or a more crystalline silicate). The purifier material is then heated 104 to activate the material. When the purifier material is a silica, the heating step may involve raising the temperature of the silica in a dry atmosphere (i.e., an atmosphere with a reduced level of water vapor). The heating temperature may be 100, 150, 200, 250, 300, 350, 400, 450, 500, 550, or 600° C. or more. For example, the heating temperature may range from about 150° C. to about 400° C., or from about 400° C. to about 600° C., among other temperature ranges.

The dry atmosphere may be made of inert gases, noble gases, reducing gases, and/or combinations of these gases. Inert gases may include dry nitrogen ($N_2$), and noble gases may include helium, argon, krypton, etc. The reducing gases may include hydrogen ($H_2$) and/or ammonia ($NH_3$), among other reducing gases. Embodiments may also include heating the purifier material under vacuum (i.e., a reduced pressure atmosphere).

The dry atmosphere may be static or dynamic (i.e., flowing). For example, the gas(es) that make up the dry atmosphere may be continuously flowing through the purifier material for a portion or the entire duration of the heating step (e.g., about 3, 6, 9, 12, 15, 18, 21, 24 hours, etc.).

Following the activation of the purifier material, the temperature may be optionally adjusted 106, for example to room temperature or below (e.g., about 25° C. or less, about 0° C., etc.), before or during purification of the hydrogen-containing material. Alternatively, the purifier can be maintained at the activation temperature, or a temperature between room temperature and the activation temperature. In still other embodiments, the purifier material adjusts to the ambient temperature of the purifier system. When the temperature of the purifier material is adjusted to a temperature that is different than ambient temperature, a cooling or heating system may be placed in thermal contact with the material to maintain its temperature.

The activated purifier material may be contacted with the starting hydrogen-containing material 108 to remove one or more impurities from the material. These impurities may include water vapor (i.e., moisture), siloxanes, germoxanes, silyl-germoxanes, and/or hydrocarbons, among other types of impurities. The reduced concentration of water vapor in the purified hydrogen-containing material may be 90%, by wt., or more compared with the starting hydrogen-containing material. For example, the water vapor concentration in a starting trisilane sample (e.g., about 3000-6500 ppb) may be reduced to about 1 ppm or less, about 500 ppb or less, about 300 ppb or less, about 100 ppb or less, about 50 ppb or less, etc., in the purified trisilane that has flowed through the purifier material. The impurities may also include decomposition products of the hydrogen-containing material being purified. For example, when the metal hydride is a poly-silane (e.g., silane having formula $Si_xH_y$, wherein x=2 or more, and y=2x+2), decomposition products may include silanols, and silanes having fewer Si atoms (e.g., monosilane).

When the hydrogen-containing material is a metal hydride, the impurities may also include higher and/or lower metal hydrides that have a greater and/or smaller number of metal atoms than the desired metal hydride. The higher metal hydrides may be formed by the combining or splitting of the desired metal hydride during synthesis and/or storage. If the desired metal hydride has the chemical formula $M_xH_y$ (where x=1 or more, and y=2x+2) the higher metal hydride may have a formula of $M_{x+z}H_{y+2z}$ (where z=1 or more). For example, when the desired metal hydride is trisilane ($Si_3H_8$), the higher polysilane impurities may include straight and isomeric forms of tetrasilane, pentasilane, hexasilane, heptasilane, etc. Similarly, a lower metal hydride may have the formula $M_{x-z}H_{y-2z}$ (where x=2 or more, and z=1 or more)

Figure 2:
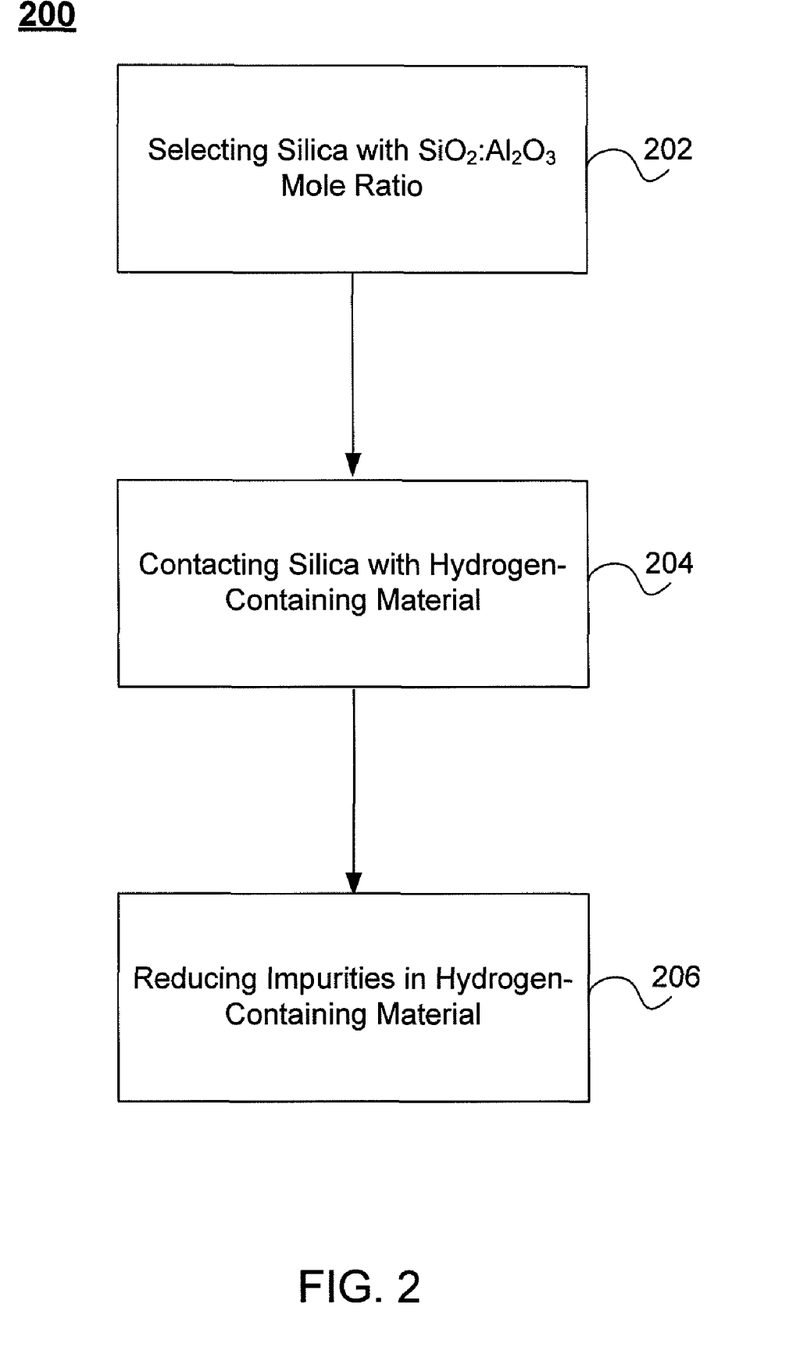
FIG. 2 is a flowchart showing selected steps in methods of reducing impurities in hydrogen-containing compositions according to embodiments of the invention.

Referring now to FIG. 2, a flowchart having selected steps in methods 200 of reducing impurities in hydrogen-containing materials such as metal compositions according to embodiments of the invention is shown. The methods 200 may include the step of selecting a silica purifier material 202 that has a ratio of $SiO_2:Al_2O_3$ (i.e., the silica to alumina ratio) that may be a certain number or more. For example, the $SiO_2:Al_2O_3$ may be about 1000, 2000, 3000, 4000, 5000, 6000, 7000, 8000, 9000, 10000, 11000, 12000, 13000, 14000, or 15000 or more.

The threshold ratio may vary for different types of metal hydrides. For example, if the metal hydride is a polysilane like trisilane, the silica to alumina ratio may be about 1000 or more (e.g., about 12000 or more). If the silica to alumina ratio drops below about 1000, the high relative concentration of alumina in the purifier material may decompose too much of the trisilane into lower silanes like mono- and disilane.

The selected silica purifier may then be put in contact with the starting metal hydride to be purified 204. As noted above, the silica purifier has been selected to significantly reduce the rate of decomposition of the metal hydride compared with purifiers having a lower $SiO_2:Al_2O_3$ ratio. Decomposition may involve the splitting of the metal hydride into lower hydrides and/or non-hydride decomposition products. For example, if the chemical formula of the metal hydride is $M_xH_y$ (where x=1 or more, and y=2x+2) decomposition products may include lower metal hydrides having a formula of $M_{x-z}H_{y-2z}$ (where z=1 or more). For example, when the metal hydride is trisilane ($Si_3H_8$), the decomposition products may include monosilane ($SiH_4$) and disilane ($Si_2H_6$).

Contact between the silica purifier and the starting metal hydride causes impurities to be removed from the metal hydride 206. As noted above, these impurities may include water vapor, siloxanes, hydrocarbons, etc., among other types of impurities. They may also include higher metal hydrides that have a greater number of metal atoms than the desired metal hydride.

The starting metal hydride may be stored premixed with other fluid components (i.e., other gases and/or liquids), or may be mixed prior to contacting (e.g., flowing) through the purifier material. These additional components may include carrier gases and/or reducing gases, and their concentrations and compositions may depend on the final application of the metal hydride. The carrier gases may include inert gases and/or noble gases such as nitrogen ($N_2$), helium, argon, krypton, etc. The reducing gases may include hydrogen ($H_2$) and/or ammonia ($NH_3$), among other reducing gases.

Exemplary Systems

Figure 3:
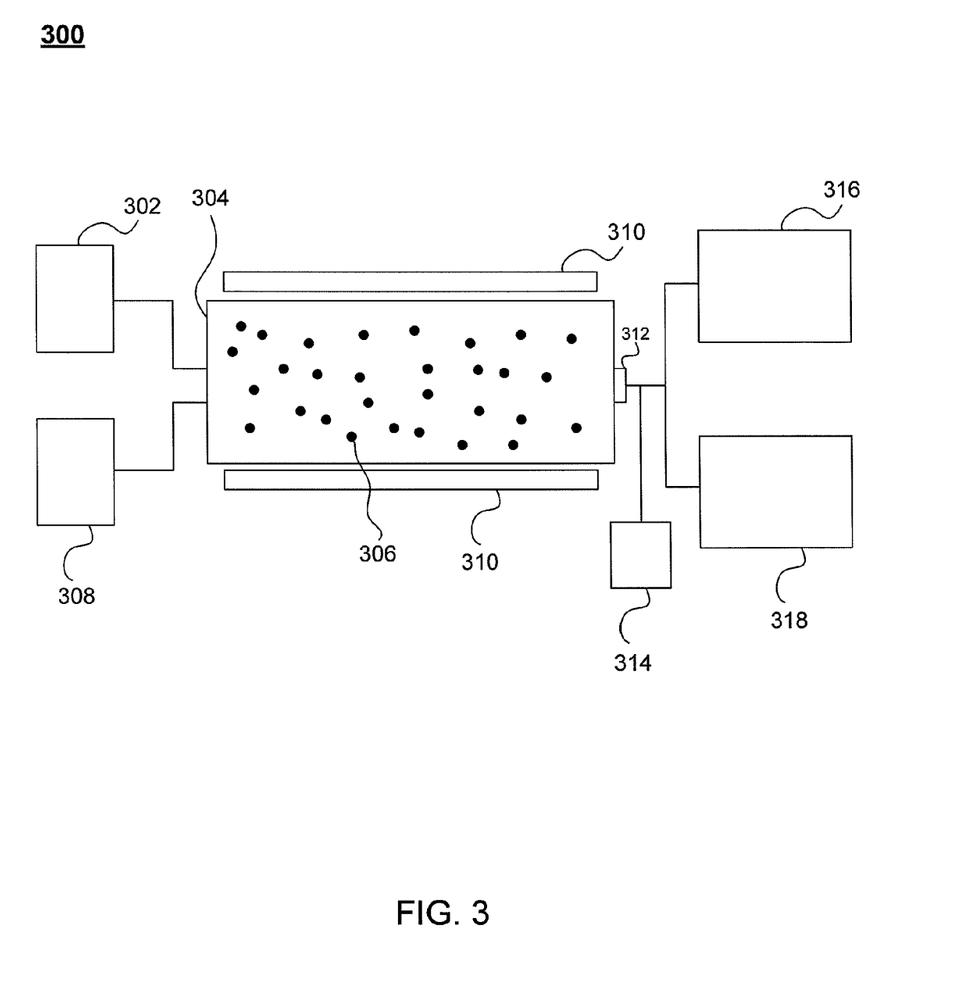
FIG. 3 is a simplified schematic of a system for purifying hydrogen-containing compositions according to embodiments of the invention.

FIG. 3 shows a simplified schematic of a system 300 for purifying hydrogen-containing materials, such as metal hydrides, according to embodiments of the invention. The system 300 may include a source 302 of starting hydrogen-containing material that includes one or more impurities. The system 300 may also include a purifier unit 304 that contains the purifier material 306. The system may further include components to activate the purifier material by heating to an activation temperature (e.g., about 100° C. or more, about 150° C. or more, etc.) in a dry atmosphere. These components may include a dry atmosphere source gas 308 and a temperature control unit 310 in thermal contact with the purifier material 306 and purifier unit 304.

Embodiments of system 300 may include valves and gas flow conduits that allow the purifier unit to be switched between an activation stage and a purification stage. During the activation stage, the valves may be adjusted so only gas from the dry atmosphere source 308 flows into the purifier unit, which is being heated to the activation temperature by the temperature control unit 310. After the dry atmosphere gas picks up moisture and other impurities from the purifier material, it may be pumped through a downstream outlet 312 on the purifier unit 304, optionally with the assistance of pumping system 314. Valves in fluid communication with the downstream outlet 312 may be adjusted to direct the dry atmosphere out of the system 300 instead of to the application component 316 or purified hydrogen material storage unit 318.

After the purifier material has been activated (if an activation step is necessary) the system 300 may be configured for a purification stage. During this stage, valves may be adjusted to allow starting hydrogen-containing material from the hydrogen-containing material source 302 to flow into the purifier unit 304 and through the purifier material 306. Optionally, the temperature control unit 310 may adjust the temperature of the purifier material 306 during the purification stage (e.g., adjusting the temperature of the purifier material to about 25° C. or less). Valves may be adjusted so that purified hydrogen-containing material exiting the downstream outlet 312 can optionally be sent to the application component 316 or the purified material storage unit 318. The application component 316 may include, for example, a silicon epitaxial growth chamber for forming a silicon layer on a substrate using chemical vapor deposition. The purified material storage unit may include a storage tank or cylinder that may be reversibly decoupled from the system 300 so it can be transported to a storage location or point of use.

System 300 may be configured to allow multiple cycles of hydrogen-containing material purification and purifier material activation. In in-situ applications of system 300, this can allow the purifier material to be recharged after a period of purification without having to physically replace the purifier material 306 from the purifier unit 304. In additional embodiments, the purifier unit 304 may be configured to allow access to the purifier material 306 so that it can be supplemented or replaced by new purifier material.

EXPERIMENTAL

Experiments were conducted to measure composition changes in a specific hydrogen-containing material: trisilane ($Si_3H_8$) after exposing samples of the starting gas to various purification materials. The starting trisilane compositions, already about 99.999% pure, were passed through purifier materials with different compositions and/or different activation temperatures. Moisture levels in the purified samples were measured using cavity ring down spectroscopy (CRDS) and compared to the moisture levels in the unpurified samples, as well as each other. Comparisons in the levels of additional impurities in the trisilane samples, including mono-, di-, and tetrasilanes, were also made using gas chromatography/mass spectroscopy (GC-MS).

Moisture Analyzer & GC Gas Manifold Experimental Setup

Figure 4:
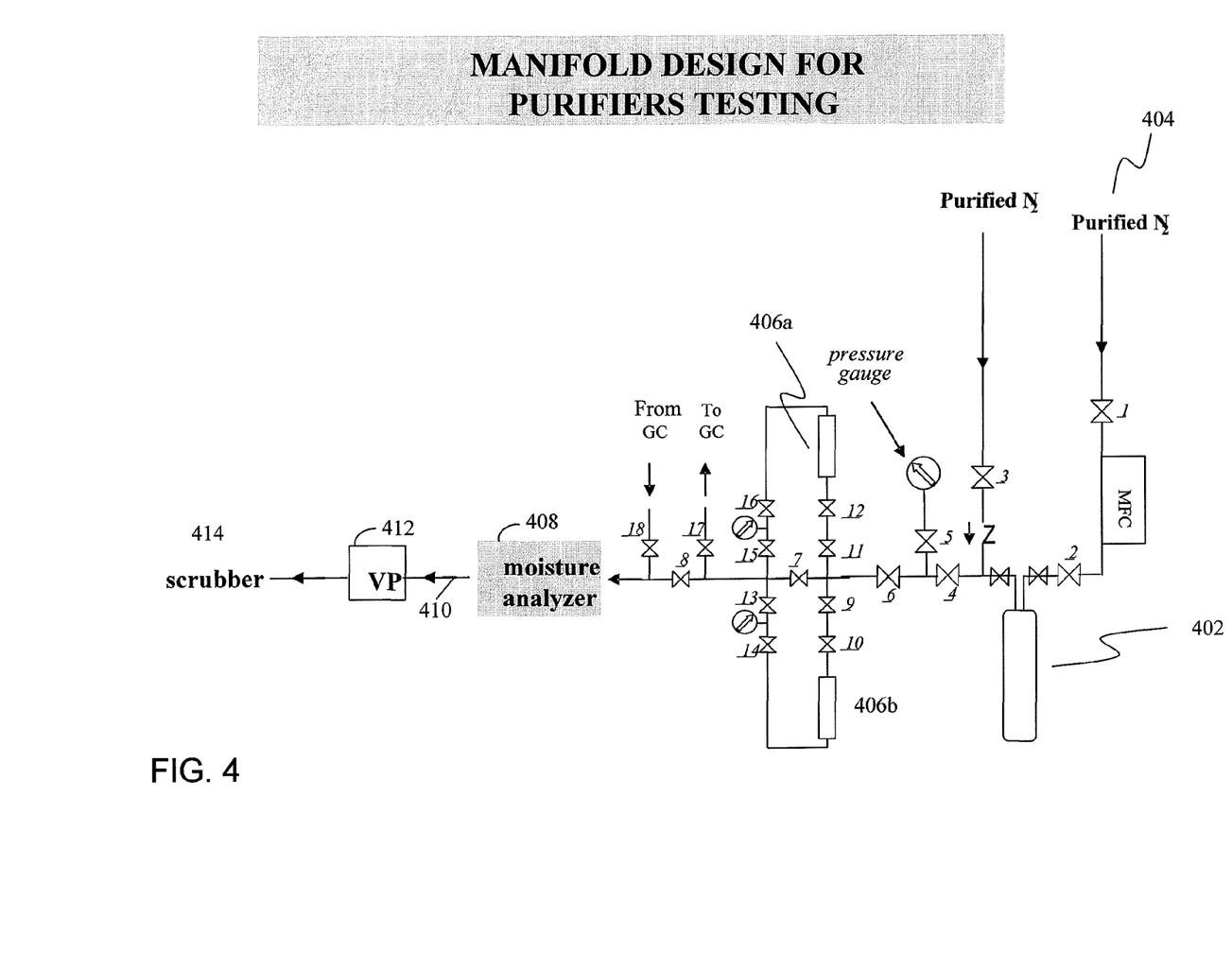
FIG. 4 is a schematic for a trisilane purifier material testing system.

A schematic of the experimental setup for measuring the impurity levels in trisilane samples is shown in FIG. 4. The schematic shows a gas manifold designed to take samples of trisilane from a lecture bottle 402. When the trisilane samples are mixed with nitrogen ($N_2$) (for example when performing a GC-MS analysis of the sample) the nitrogen is supplied by nitrogen source 404. Purified trisilane sample vapor may be generated by sending the sample through one or more purifier material 406a-b. The manifold is also configured to have unpurified samples bypass the purifier materials 406a-b for comparative measurements of the impurities levels.

After a trisilane sample either passes through or bypasses the purifier material, it flows to analysis equipment for impurities measurements. The manifold valves may be configured to flow the sample directing into a cavity ring down spectrometer 408 to measure the moisture content in the sample. Alternatively, the manifold valves may be configured to flow the sample into a gas chromatogram-mass spectrometer (not shown) to measure the relative amounts of trisilane and other silanes (e.g., monosilane, disilane, iso-tetrasilane, n-tetrasilane, etc.). The sample may then return from the GC-MS for additional measurements in the CRDS, or may flow to the exhaust section of the manifold 410.

In the exhaust section 410 of the manifold, the samples may be run through a series of cold traps 412 to capture condensable waste materials and then pass through a scrubber 414 before being vented out of the manifold.

Moisture and GC Analysis

To prepare for the trisilane moisture measurements, purified $N_2$ is used to purge and dry-down the manifold, and the manifold pressure is maintained at approximately 1000 torr. The pressure of the ring-down cavity was set for 250 torr and 30° C. to allow maximum $N_2$ flow through the cavity cell. The manifold and the CRDS usually dry down within one or two days.

During the measurements, the trisilane sample vapor travels through the manifold and either passes through the purifier material, or bypasses it. The trisilane sample may also pass through the GC or bypass this instrument and head directly to the moisture analyzer. After measurements are taken in the moisture analyzer, the trisilane sample vapor passes to the scrubber. When GC analyses are also performed, the trisilane sample vapor can pass through the GC sample loop before entering the moisture analyzer. The GC response is calibrated using a 10 ppm disilane in helium standard.

Description of the Purifier Materials Tested

The purifier materials tested included three materials: silicates with amorphous structure (Material A), and crystalline silicates (Materials B & C). Some physical characteristics, capacity and efficiency data for the tested silica gels and crystalline silicates are given in Table 1:

TABLE 1

Characteristics and Efficiency Data for Selected Silicas:

| | Material A | | Material B | Material C |
|---|---|---|---|---|
| Activation Temp [° C.] | 150 | 400 | 400 | 400 |
| Structure | Amorphous | | Crystalline | Crystalline |
| Surface Area [m²/g] | 300 | | | 400 |
| Pore size [Å] | 100 | | 4 | 6 |
| pH | 7.4 | | 11 | 10.5 |
| $SiO_2/Al_2O_3$ (mol ratio) | 12000 | | 1-10 | 800-1000 |
| $H_2O$ Capacity in $N_2$ [L/L] 900 ppm challenge | 9.11 | 2.79 | | 5 |
| $H_2O$ efficiency in $N_2$ ($H_2O$ Sensor) | <10 ppb | | | <10 ppb |

The Material B was already in an activated state from the manufacturer. The Material C was activated at 400° C. or 24 hours in 1 slpm $N_2$ prior to the experiments on a separate manifold at a different location. The activation treatment of the Material A includes thermal activation at two different temperatures: 150° C. and 400° C. for 24 hrs in 1 slpm $N_2$. Moisture capacity and efficiency of the silica materials were measured using moisture sensors on a separate manifold.

Experimental Results

As expected, not all silicon containing materials were ideal for trisilane purification. Of the purifier materials tested, the Material A activated at 400° C. for 24 hours in 1 slpm of $N_2$ appeared most effective at reducing moisture and tetrasilane levels in a trisilane vapor stream. For Material A, the thermal activation above 150° C. enhanced moisture removal and reduced decomposition of the trisilane. While not wishing to be bound to a particular theory of how the thermal activation process works, it is believed heating these materials above 150° C. converts reactive silanol (Si—OH) groups on the surface of the materials into less reactive Si—O—Si groups.

Figure 5:
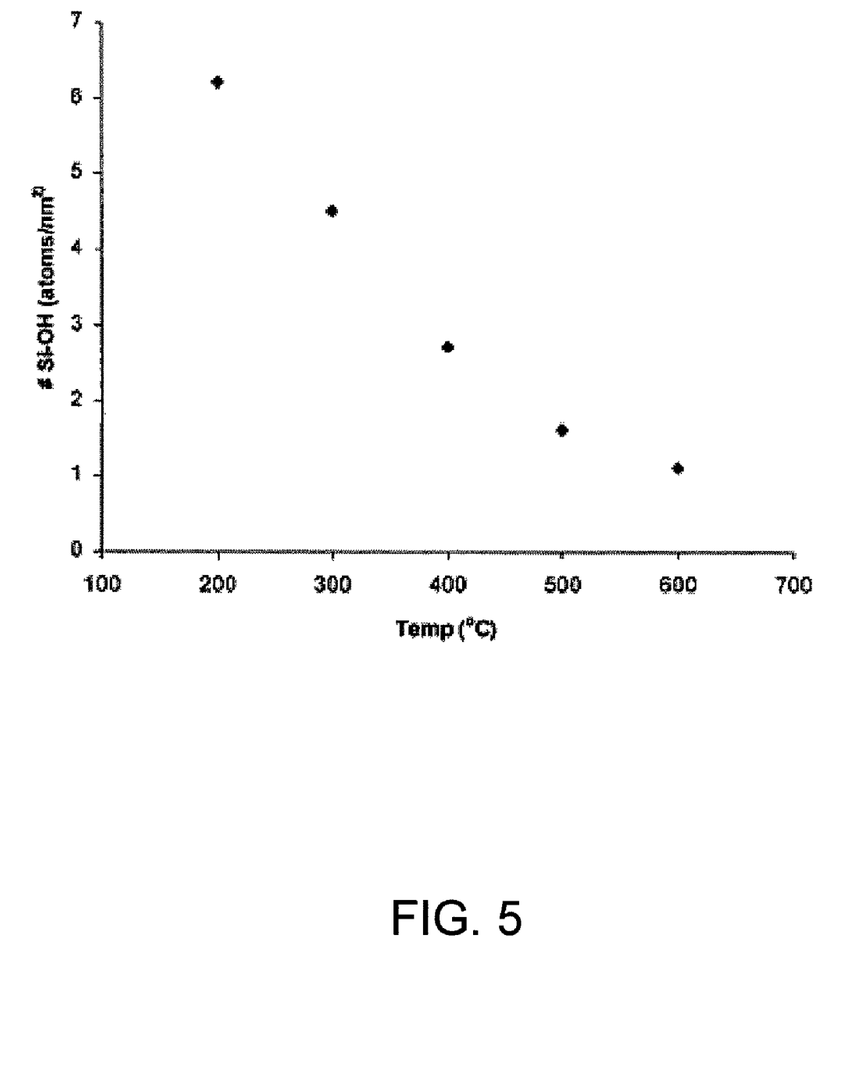
FIG. 5 is a plot of silanol group density as a function of silica gel activation temperature.

FIG. 5 shows a plot of the decreasing surface density of Si—OH groups (in atoms/$nm^2$) as a function of the Material A activation temperature. The amount of Si—OH was observed to decrease significantly when the activation temperature is set from about 200° C. to about 400° C. It is believed that the Si—OH groups readily react with the trisilane to form $Si_xH_y$ decomposition products and hydrogen gas. Thus, by decreasing the density of the Si—OH groups on the purifier surface through thermal activation reduces the decomposition of the trisilane as well as increases the sites available for capturing moisture in the trisilane vapor.

Another reactive species present in many trisilane purifier materials is aluminum (Al), usually occurring in oxidized form as alumina ($Al_2O_3$). Aluminum is very reactive with silane compounds and can quickly decompose higher silanes like trisilane. Alumina ($Al_2O_3$) has been shown to decompose silanes and alkyl silanes. Thus, the trisilane purification results were also compared with the relative amounts of silica ($SiO_2$) to alumina ($Al_2O_3$) (i.e., the $SiO_2$:$Al_2O_3$ ratio) in the purification material. Material A had a high $SiO_2$:$Al_2O_3$ ratio of about 12000, while Material B & C had substantially lower $SiO_2$:$Al_2O_3$ ratios: The Material B had a ratio of about 10, and Material C had a ratio of about 800-1000.

Results of the Moisture Challenge Tests

As noted above, the capacities of the examined purifier materials were measured using a 900 ppm $H_2O$ challenge in 1 slpm $N_2$ using a moisture generator. The Material A activated at 400° C. had the lowest capacity at 2.79 L $H_2O$ per liter of purifier material (L/L). The same Material A activated at 150° C. had a better capacity at 9.11 L/L and the Material C had a capacity of about 5.0 L/L. The capacity of Material B was not determined.

The Material A, B, & C had a moisture efficiency of 10 ppb or lower as summarized in Table 1 supra.

Experimental Results

1. Material A

Figure 6:
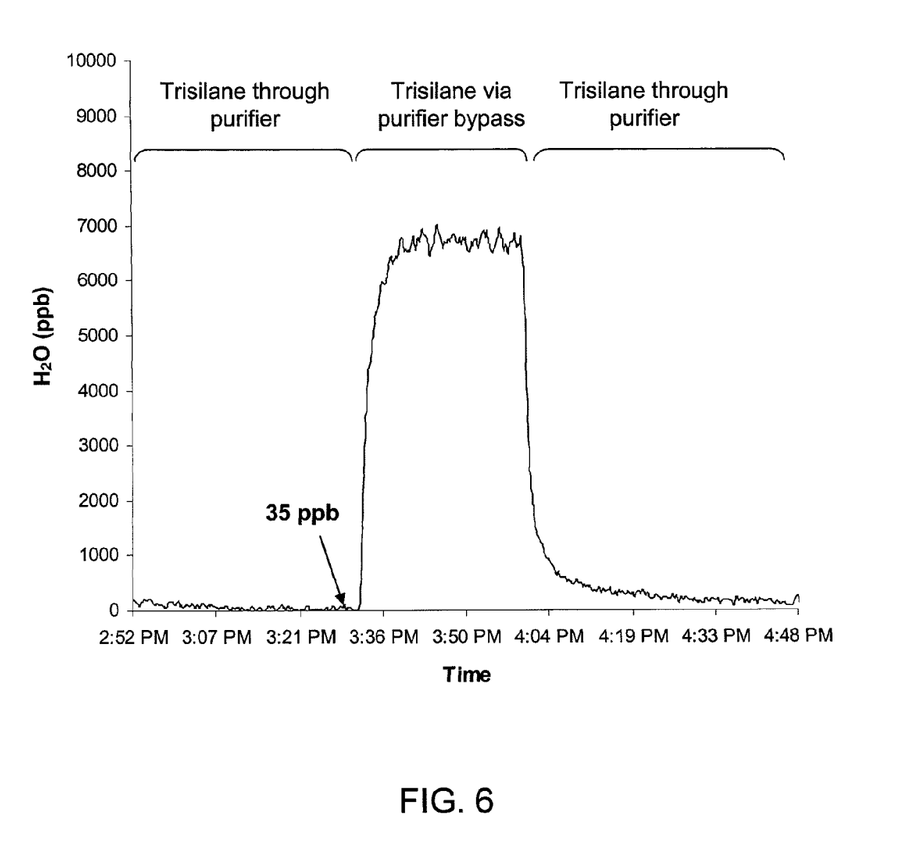
FIG. 6 is a graph of the moisture impurity concentration in a trisilane sample.

The water concentration in the neat/pure trisilane vapor that bypassed the purifier material was about 6500 ppb. When the trisilane sample was instead flowed through the Material A activated at 400° C., the water vapor impurity concentration dropped from 6500 ppb to about 35 ppb in the purified trisilane stream, an over 100-fold reduction. FIG. 6 shows the time plot spectra of water vapor concentration over a cycle of unpurified trisilane and purified trisilane passing through the activated Material A.

2. Material B

As noted above, the water concentration in the neat/pure trisilane was approximately 6500 ppb when bypassing the purifier material. When the trisilane was then flowed through the Material B purifier, the water concentration dropped to about 300 ppb, over an order of magnitude decrease in the water vapor concentration.

3. Material C

Using a source of trisilane from Matheson Tri-Gas, the water vapor concentration in the unpurified neat source sample was approximately 500 ppb, as measured in a sample that by passed the purifier material. When the trisilane then flowed through the Material C, the water vapor concentration actually increased to approximately 2000 ppb.

GC-MS Experimental Results

Figure 7:
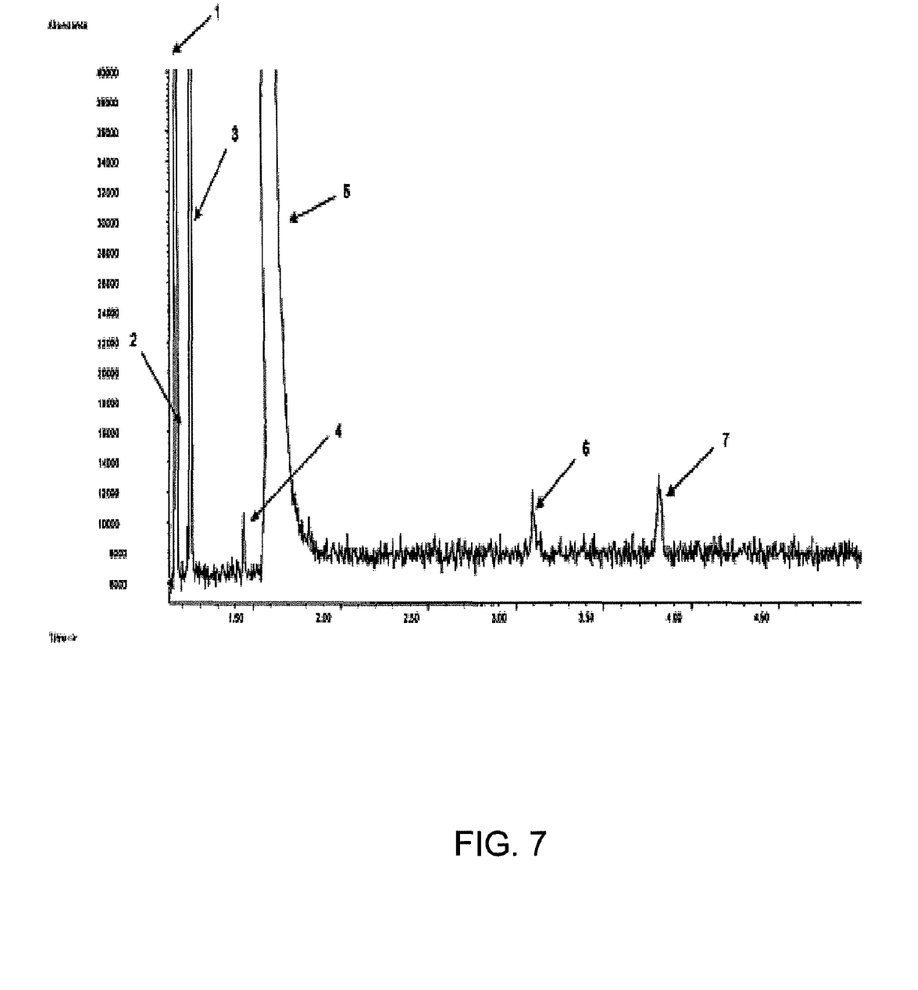
FIG. 7 is a chromatogram of a trisilane sample.

Neat trisilane that bypassed the purifier material was analyzed by the GC and the resulting chromatogram shown in FIG. 7 indicated that the largest peak (peak 5) was the trisilane. Other impurities were identified by retention time and molecular weight. Peaks 1, 3, 6, and 7 in the chromatogram correspond to monosilane, disilane, iso-tetrasilane, and n-tetrasilane, respectively. Peaks 2 and 4 are siloxanes. Based on calibrations using a 10 ppm disilane in He standard, the trisilane contained about 27.5 ppm of monosilane and 191 ppm of disilane. The concentrations of the siloxanes, iso-tetrasilane, and n-tetrasilane were estimated to be 2.5, 2.7, and 5.1 ppm using the same disilane calibration standard. All trisilane samples received were analyzed to confirm the level of impurities. Another trisilane source from Matheson Tri-Gas showed higher impurity levels, which were believed to be the result of natural decomposition over time. Table 2 summarizes the impurity levels measured by GC in the trisilane source used.

TABLE 2

Impurity Levels in Trisilane Calculated Based on Response Factor of 10 ppm Disilane Standard

| Compound | % Assay | Conc (ppm) |
| --- | --- | --- |
| $SiH_4$ | 0.098 | 27.5 |
| $Si_2H_6$ | 0.684 | 191 |
| $Si_2H_6O$ | 0.009 | 2.5 |
| $Si_3H_8$ | 99.182 | — |
| $i-Si_4H_{10}$ | 0.01 | 2.7 |
| $n-Si_4H_{10}$ | 0.018 | 5.1 |

1. Material A

Figure 8:
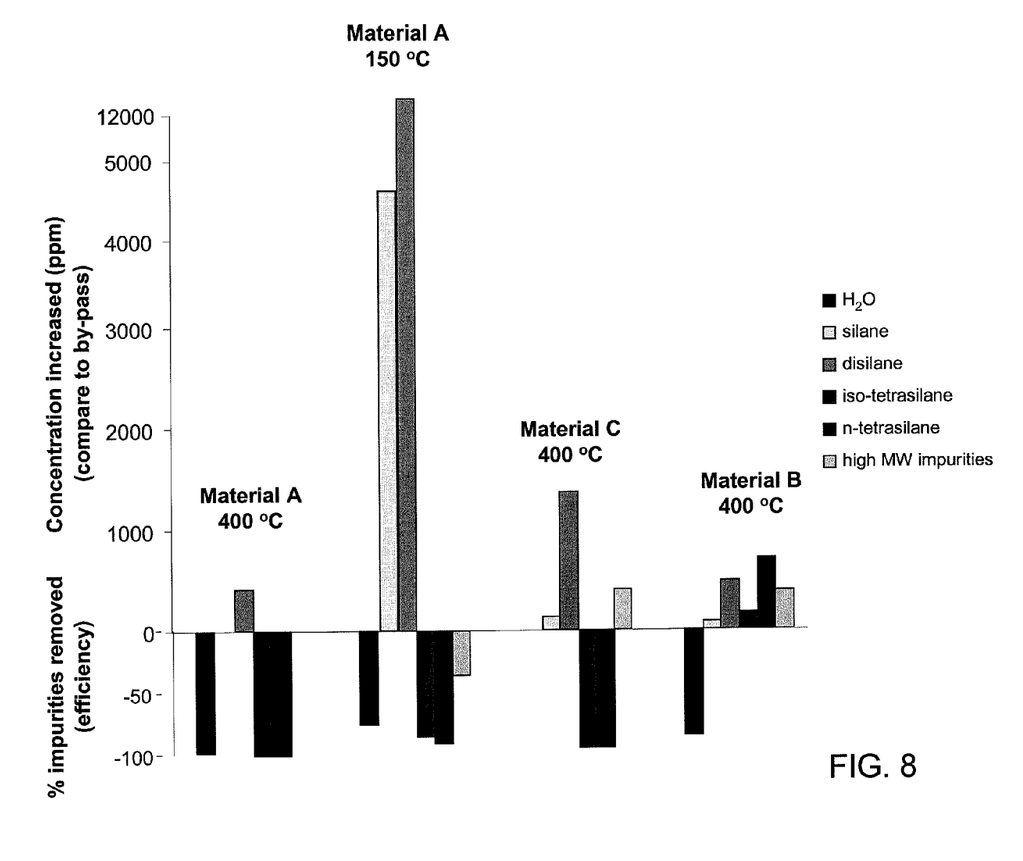
FIG. 8 is a graph of various impurity concentrations to plot the effect of the purifier material on the purity of the trisilane produced.

GC-MS impurity analyses were done on trisilane samples that passed through Material A activated at 400° C. for 24 hours in 1 slpm $N_2$. The GC-MS analysis of the trisilane samples passed through the activated Material A showed that substantially all the iso-tetrasilane and n-tetrasilane was removed. The analysis also indicated a slight increase in the concentration of monosilane from about 12 ppm to about 17 ppm, and an increase in disilane from about 251 ppm to about 666 ppm. These increased in mono- and disilane were believed to be caused in part by the decomposition of higher silanes (including trisilane) that may have come into contact with Si—OH groups on the silica gel. FIG. 8 is a graph showing the concentration changes in various impurities for trisilane samples that bypassed or passed through a Material A purifier thermally activated at 400° C.

A comparative test was also performed to measure the effect of activation temperature on the impurity levels for Material A. Material A activated at 150° C. for 24 hours in 1 slpm of $N_2$ generated larger concentrations of monosilane (approximately 4500 ppm) and disilane (approximately 12,000 ppm) than the Material A activated at higher temperature. However, the low temperature activated Material A also removed the tetrasilanes below the level of detection. The comparison of the 150° C. and 400° C. temperature activated Material A support the theory that more of the Si—OH groups are converted to Si—O—Si upon heating at higher temperature. The lower density of Si—OH groups at 400° C. results in less of the trisilane being converted to mono- and disilane.

2. Material B

Significant amounts of impurities were generated form trisilane when it was exposed to the Material B. This material decomposed the trisilane to significant amounts of monosilane (approximately 100 ppm), disilane (approximately 500 ppm), as well as converting the trisilane to iso-tetrasilane (approximately 200 ppm) and n-tetrasilane (approximately 700 ppm), and higher molecular weight impurities (approximately 400 ppm). Material B had the highest concentrations of aluminum of all the purifier materials tested. Thus, the extent of trisilane decomposition and conversion to higher silanes supports the idea that Al plays a role in forming reactive silane species (possibly $SiH_3^-$ and/or $SiH_3 \bullet$). These reactive silane ions and radicals significantly accelerate the decomposition and conversion of trisilane to other compounds, including higher silanes like iso-tetrasilane, n-tetrasilane, and pentasilane ($Si_5H_{12}$). The ratio of iso-tetrasilane to n-tetrasilane observed in the chromatogram is 1:2, indicating this reaction is not selective.

3. Material C

The Material C purifier removed about 95% of the tetrasilanes, but generated significant amounts of monosilane (approximately 150 ppm) and disilane (approximately 1400 ppm), as well as some higher molecular weight impurities (approximately 400 ppm).

Purifier Conditioning Tests

During the conditioning test, it took approximately 25 minutes for neat trisilane to condition a Material A purifier activated at 400° C. The temperature of the silica gel purifier remained at room temperature for the duration of the conditioning test. By comparison, another conditioning test was performed by exposing neat trisilane to an Material C purifier for more than half an hour. During this time, the Material C purifier continuously chemically absorbed trisilane and the CRDS indicated that no trisilane vapor flowed through the purifier. Meanwhile, the temperature of the purifier increased from room temperature (approximately 25° C.) to about 40° C. The temperature increase indicates that the Material C is absorbing trisilane, and may also explain why more water vapor appears to be emitted from this purifier material than is being removed.

Experimental Summary

Table 3 below summarizes the performance results for three purifier materials analyze in these experiments.

TABLE 3

Summary of Purification Performance for Tested Materials

|  | Material A | | Material B | Material C |
|---|---|---|---|---|
| Temperature of Activation | 150° C. | 400° C. | 400° C. | 400° C. |
| Al Concentration | ~70 ppm | ~70 ppm | 10% | 1000 ppm |
| Number of Si—OH (atom/nm$^2$) | 6.2 | 2.7 | N/A | N/A |
| Capacity Data in N$_2$ | Good | Good | N/A | Good |
| Efficiency Data in Trisilane | Poor Efficiency 600 ppb through purifier, 6500 ppb through by-pass. | Good Efficiency 35 ppb through purifier, 6500 ppb through by-pass. | Poor Efficiency 300 ppb through purifier, 6500 ppb through by-pass. | Bad, Emits H$_2$O, 2000 ppb through purifier, 800 ppb through by-pass. |
| Decomposition | Generate ~4500 ppm silane & ~12,000 ppm disilane. Remove 80-90% tetrasilanes, & 35% of high MW impurities. | Generate 5 ppm silane & ~400 ppm disilane. Remove 100% of tetrasilanes. | Generate ~100 ppm silane, ~500 ppm disilane, ~900 ppm tetrasilanes, & ~400 ppm high MW impurities. | Generate ~150 ppm silane, ~1400 ppm disilane, & ~400 ppm high MW impurities. Remove ~90% of tetrasilanes. |
| Effect of Activation Temp on decomposition | At 150° C., silane & disilane impurities is many times compared to at 400° C. | At 400° C., silane & disilane impurity is very low in conc. at 150° C. | N/A | N/A |
| Effect of Al concentration on decomposition | N/A | At ~70 ppm Al conc., tetrasilanes & higher MW impurities were not observed. | At 10% Al conc., ~1300 ppm of tetrasilanes & higher MW impurities were observed. | At 1000 ppm Al conc., ~400 ppm of tetrasilanes & higher MW impurities were observed. |
| Chemisorption/ Temperature of the purifier on exposure to Trisilane | No - material conditioned rapidly | No - material conditioned rapidly | N/A | Yes, absorbs trisilane. Temp increased to ~40° C. |

The Material A purifier activated at 400° C. showed the best performance of all the trisilane purifier materials tested, but many of the other purifier materials are also suitable for reducing moisture and other impurities in trisilane to levels that are acceptable for many modern electronic and semiconductor fabrication applications. For example, silica gels activated at lower temperatures (e.g., 150° C.) and the Material B purifier may be used in applications were moisture reduction is more important than increased levels of lower silanes (e.g., monosilane and disilane).

All the purifier materials tested decomposed trisilane to some degree. Those that were more concentrated in aluminum (as reflected by a lower $SiO_2:Al_2O_3$ ratio) tended to decompose the trisilane to a greater extent. Those with higher $SiO_2:Al_2O_3$ ratios were more inert to trisilane. As noted above, the selection of a trisilane purifier material may depend on the ultimate end use of the trisilane, and the extent to which a tradeoff can be made between lower levels of moisture and increased levels of lower silanes.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the purifier" includes reference to one or more purifiers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of purifying a hydrogen-containing material, the method comprising the steps of: providing a purifier material comprising silica and having a $SiO_2:Al_2O_3$ mole ratio greater than 800; heating the silica at temperature of about 100° C. or more in a dry atmosphere to form activated silica; contacting the activated silica with a starting hydrogen-containing material, wherein the activated silica reduces a concentration of one or more impurity from the starting hydrogen-containing material to form the purified hydrogen-containing material, and wherein the activated silica does not decompose the purified hydrogen-containing material by more than 1.65%.

2. The method of claim 1, wherein the silica is heated at a temperature of about 150° C. or more in a dry atmosphere to form the activated silica.

3. The method of claim 1, wherein the hydrogen-containing material comprises one or more Group III, IV, or V elements.

4. The method of claim 3, wherein the hydrogen-containing material comprises one or more atoms selected from the group consisting of boron, carbon, nitrogen, aluminum, silicon, phosphorous, gallium, germanium, arsenic, indium, tin, antimony, thallium, lead, and bismuth.

5. The method of claim 3, wherein the hydrogen-containing material comprises two or more different Group III, IV, or V elements.

6. The method of claim 1, wherein the hydrogen-containing material comprises one or more silicon hydrides.

7. The method of claim 6, wherein the silicon hydride comprises a polysilicon hydride with a formula $Si_xH_y$, wherein x=2 or more; and y=2x+2.

8. The method of claim 6, wherein the silicon hydride comprises disilane, trisilane, tetrasilane, or pentasilane.

9. The method of claim 8, wherein the silicon hydride comprises trisilane.

10. The method of claim 1, wherein the silica is heated to a temperature from about 150° C. to about 400° C.

11. The method of claim 1, wherein the silica is heated to a temperature of about 600° C. or more.

12. The method of claim 1, wherein the silica is heated to a temperature of about 400° C. to about 600° C.

13. The method of claim 1, wherein the silica comprises silica gel.

14. The method of claim 1, wherein the impurity comprises water vapor.

15. The method of claim 14, wherein the purified hydrogen-containing material has a water vapor concentration of about 1 ppm or less.

16. The method of claim 14, wherein the purified hydrogen-containing material has a water vapor concentration of about 50 ppb or less.

17. The method of claim 1, wherein the impurity is selected from the group consisting of hydrocarbons, siloxanes, germoxanes, and silyl-germoxanes.

18. The method of claim 1, wherein the impurity comprises a decomposition product of the hydrogen-containing material.

19. The method of claim 1, wherein the impurity comprises a polysilane with a formula $Si_xH_y$, wherein x=2 or more, and y=2x+2.

20. The method of claim 1, wherein the dry atmosphere comprises at least one inert gas.

21. The method of claim 20, wherein the inert gas comprises nitrogen ($N_2$), helium (He), or argon (Ar).

22. The method of claim 1, wherein the dry atmosphere comprises at least one reducing gas.

23. The method of claim 22, wherein the reducing gas comprises hydrogen ($H_2$) or ammonia ($NH_3$).

24. The method of claim 1, wherein the hydrogen-containing material is carried through the activated silica by a carrier gas comprising molecular hydrogen ($H_2$), helium (He), argon (Ar), or nitrogen ($N_2$).

25. The method of claim 1, wherein the activated silica is cooled to a purification temperature of about 25° C. or less when the activated silica is contacted with the starting hydrogen-containing material.

26. A method of reducing impurities in a poly-metal hydride, the method comprising:
providing a purifier material comprising silica and having a $SiO_2:Al_2O_3$ mole ratio greater than 1000; and
contacting the purifier material with the poly-metal hydride, wherein the purifier material reduces a concentration of higher metal hydrides that have a greater number of metal atoms than the poly-metal hydride.

27. The method of claim 26, wherein the purifier material also reduces a concentration of lower metal hydrides that have a smaller number of metal atoms than the poly-metal hydride.

28. The method of claim 26, wherein the poly-metal hydride comprises two or more different metals.

29. The method of claim 26, wherein the poly-metal hydride comprises carbon, nitrogen, or both carbon and nitrogen.

30. The method of claim 26, wherein the poly-metal hydride comprises a polysilane having a formula of $M_xH_y$, wherein x=2 or more, and y=2x+2, and the higher metal hydride has a formula of Mx+zHy+2z where z=1 or more.

31. The method of claim 26, wherein the poly-metal hydride comprises trisilane and the higher metal hydride comprises tetrasilane.

32. The method of claim 26, wherein purifier material has a $SiO_2:Al2O_3$ mole ratio of about 12000 or more.

33. The method of claim 26, wherein the purifier material comprises silica gel.

34. The method of claim 26, wherein the purifier material is heated at temperature of about 100° C. or more.

35. The method of claim 26, wherein the purifier material is heated at a temperature of about 400° C. or more.

36. The method of claim 26, wherein the silica is heated to a temperature from about 150° C. to about 400° C.

37. The method of claim 26, wherein the silica is heated to a temperature of about 600° C. or more.

38. The method of claim 26, wherein the silica is heated to a temperature of about 400° C. to about 600° C.

39. The method of claim 26, wherein the purifier material reduces a concentration of water in the metal hydride to about 1 ppm or less.

40. The method of claim 26, wherein the purifier material reduces a concentration of water in the metal hydride to about 50 ppb or less.

41. A method of reducing impurities in a poly-metal hydride, the method comprising:
providing a purifier material comprising silica and having a $SiO_2:Al_2O_3$ mole ratio greater than 1000; and
contacting the purifier material with the poly-metal hydride, wherein the purifier material reduces formation of higher metal hydrides that have a greater number of metal atoms than the poly-metal hydride.

42. The method of claim 41, wherein the purifier material also reduces a concentration of lower metal hydrides that have a smaller number of metal atoms than the poly-metal hydride.

43. The method of claim 41, wherein the higher metal hydrides are formed by the combination of the poly-metal hydride with one or more additional metal containing species.

44. A method of reducing impurities in a hydrogen-containing material, the method comprising:
contacting a purifier material with the hydrogen-containing material, wherein the purifier material comprises silica having an $SiO_2:Al_2O_3$ mole ratio of at least about 800, and wherein the purifier material reduces the concentration of oxygen-containing impurities in the hydrogen-containing material.

45. The method of claim 44, wherein the hydrogen-containing material comprises a silicon-containing material.

46. The method of claim 45, wherein the hydrogen-containing material comprises at least one of monosilane, disilane, trisilane, tetrasilane, or pentasilane.

47. The method of claim 44, further comprising, prior to the contacting:
activating the purifier material my heating the silica at a temperature of at least about 100° C. or greater in a dry atmosphere.

48. The method of claim 47, wherein the dry atmosphere comprises at least one inert gas selected from the group consisting of nitrogen, helium, or argon.

49. The method of claim 44, further comprising, prior to the contacting:
conditioning the purifier material by exposing the silica to a conditioning composition for a period of time.

50. The method of claim 49, wherein the period of time is less than 30 minutes and the temperature of the purifier material does not increase during the conditioning.

51. The method of claim 49, wherein the conditioning composition comprises trisilane.

52. The method of claim 44, wherein the oxygen-containing impurities comprise at least one of a siloxane, a germoxane, a silyl-germoxane, or water vapor.

* * * * *

UNITED STATES PATENT AND TRADEMARK OFFICE
CERTIFICATE OF CORRECTION

| | | |
|---|---|---|
| PATENT NO. | : 8,268,046 B2 | |
| APPLICATION NO. | : 12/466272 | |
| DATED | : September 18, 2012 | |
| INVENTOR(S) | : Tadaharu Watanabe et al. | |

It is certified that error appears in the above-identified patent and that said Letters Patent is hereby corrected as shown below:

In the Claims:

Column 12, line 66, please delete "purified."

Signed and Sealed this
First Day of January, 2013

David J. Kappos
*Director of the United States Patent and Trademark Office*